US012614137B2

(12) United States Patent
Hartwig et al.

(10) Patent No.: US 12,614,137 B2
(45) Date of Patent: Apr. 28, 2026

(54) SYSTEM AND METHOD FOR PREDICTIVE ANALYSIS OF TECHNOLOGY INFRASTRUCTURE REQUIREMENTS

(71) Applicant: Wells Fargo Bank, N.A., San Francisco, CA (US)

(72) Inventors: John William Hartwig, Saint Louis, MO (US); David Alan Endres, Edwardsville, IL (US)

(73) Assignee: Wells Fargo Bank, N.A., San Francisco, CA (US)

( * ) Notice: Subject to any disclaimer, the term of this patent is extended or adjusted under 35 U.S.C. 154(b) by 213 days.

(21) Appl. No.: 18/299,210

(22) Filed: Apr. 12, 2023

(65) Prior Publication Data
US 2024/0346414 A1 Oct. 17, 2024

(51) Int. Cl.
*G06Q 10/0631* (2023.01)

(52) U.S. Cl.
CPC .............................. *G06Q 10/06315* (2013.01)

(58) Field of Classification Search
CPC ................................................ G06Q 10/06315
See application file for complete search history.

(56) References Cited

U.S. PATENT DOCUMENTS

| | | | |
|---|---|---|---|
| 10,784,963 B2 | 9/2020 | Choudhury et al. | |
| 10,922,623 B2 | 2/2021 | Chen et al. | |
| 11,489,749 B2 | 11/2022 | Samadi et al. | |

| | | | |
|---|---|---|---|
| 2005/0259683 A1* | 11/2005 | Bishop | H04L 41/5009 |
| | | | 370/468 |
| 2018/0227192 A1 | 8/2018 | Jain et al. | |
| 2019/0026663 A1* | 1/2019 | Homeyer | G06Q 10/06316 |

(Continued)

FOREIGN PATENT DOCUMENTS

| | | | |
|---|---|---|---|
| CA | 2695102 | 8/2010 | |
| EP | 3642714 B1 * | 3/2023 | G06F 11/3604 |

OTHER PUBLICATIONS

M. Alabadi, A. Habbal and X. Wei, "Industrial Internet of Things: Requirements, Architecture, Challenges, and Future Research Directions," in IEEE Access, vol. 10, pp. 66374-66400, 2022, doi: 10.1109/ACCESS.2022.3185049. (Year: 2022).*

(Continued)

*Primary Examiner* — Jerry O'Connor
*Assistant Examiner* — Jeremy L Gunn
(74) *Attorney, Agent, or Firm* — SCHWEGMAN LUNDBERG & WOESSNER, P.A.

(57) ABSTRACT

Various examples are directed to computer-implemented systems and methods for predictive analysis of technology infrastructure capacity requirements. A method includes receiving a product roadmap input indicating technological requirements of an enterprise, and analyzing the product roadmap input to locate and extract capacity data from the product roadmap input. Using machine learning, technology infrastructure capacity requirements are predicted for the enterprise based on the capacity data. The technology infrastructure capacity requirements are validated, and technological resources are determined to meet the technology infrastructure capacity requirements. When the technology infrastructure capacity requirements are validated, the technological resources are automatically provisioned to meet the technology infrastructure capacity requirements.

20 Claims, 6 Drawing Sheets

(56) References Cited

U.S. PATENT DOCUMENTS

| | | | | |
|---|---|---|---|---|
| 2020/0311573 | A1* | 10/2020 | Desai | H04L 47/826 |
| 2021/0241866 | A1* | 8/2021 | Bhattacharya | G06F 30/10 |
| 2021/0304149 | A1* | 9/2021 | Al-Sinan | G06Q 10/0639 |
| 2022/0036302 | A1* | 2/2022 | Cella | G05B 13/0265 |
| 2024/0105317 | A1* | 3/2024 | Howard | G06Q 10/06315 |
| 2024/0289712 | A1* | 8/2024 | Krishnaiah | G06Q 10/06375 |
| 2024/0346414 | A1* | 10/2024 | Hartwig | G06Q 10/06315 |

OTHER PUBLICATIONS

Morales, Fernando, "Incremental Capacity Planning in Optical Transport Networks Based on Periodic Performance Metrics", 18th International Conference on Transparent Optical Networks, (2016), 4 pgs.

* cited by examiner

SYSTEM AND METHOD FOR PREDICTIVE ANALYSIS OF TECHNOLOGY INFRASTRUCTURE REQUIREMENTS

TECHNICAL FIELD

This document relates generally to computer systems and more particularly to systems and methods for using a product roadmap for predictive analysis of technology infrastructure capacity needs.

BACKGROUND

Modern business enterprises depend on a plurality of technological systems for sustainable day-to-day operations. These technological systems are indispensable and it is critical for success of the business enterprises that the technological systems are fully functional and updated. In addition, to maintain the growth needed to sustain operations, it is important that the business enterprises stay on the leading edge of technology by anticipating changes in infrastructure needs and planning for replacements and upgrades for technological systems. Improved systems and methods for predictive analysis of technology infrastructure capacity requirements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which.

DETAILED DESCRIPTION

Business enterprises such as financial institutions depend on a plurality of technological systems for sustainable day-to-day operations. These technological systems are indispensable and it is critical for success of the business enterprises that the technological systems are fully functional and updated. In addition, to maintain the growth needed to sustain operations, it is important that the business enterprises stay on the leading edge of technology by anticipating changes in infrastructure needs and planning for replacements and upgrades for technological systems.

The present subject matter provides systems and methods for predictive analysis of technology infrastructure capacity requirements. Various embodiments include receiving a product roadmap input indicating technological requirements of an enterprise, and analyzing the product roadmap input to locate and extract capacity data from the product roadmap input. Using machine learning, technology infrastructure capacity requirements are predicted for the enterprise based on the capacity data. The technology infrastructure capacity requirements are validated, and technological resources are determined to meet the technology infrastructure capacity requirements. In various embodiments, the technological resources are automatically provisioned to meet the technology infrastructure capacity requirements.

The present system for predictive analysis of technology infrastructure capacity requirements may include a specialized computer system for providing users with an interface to access data within the systems, providing the users with an interface to monitor the system, and may further include customized or dedicated computer storage or memory for the users, in various embodiments.

Figure 1A:
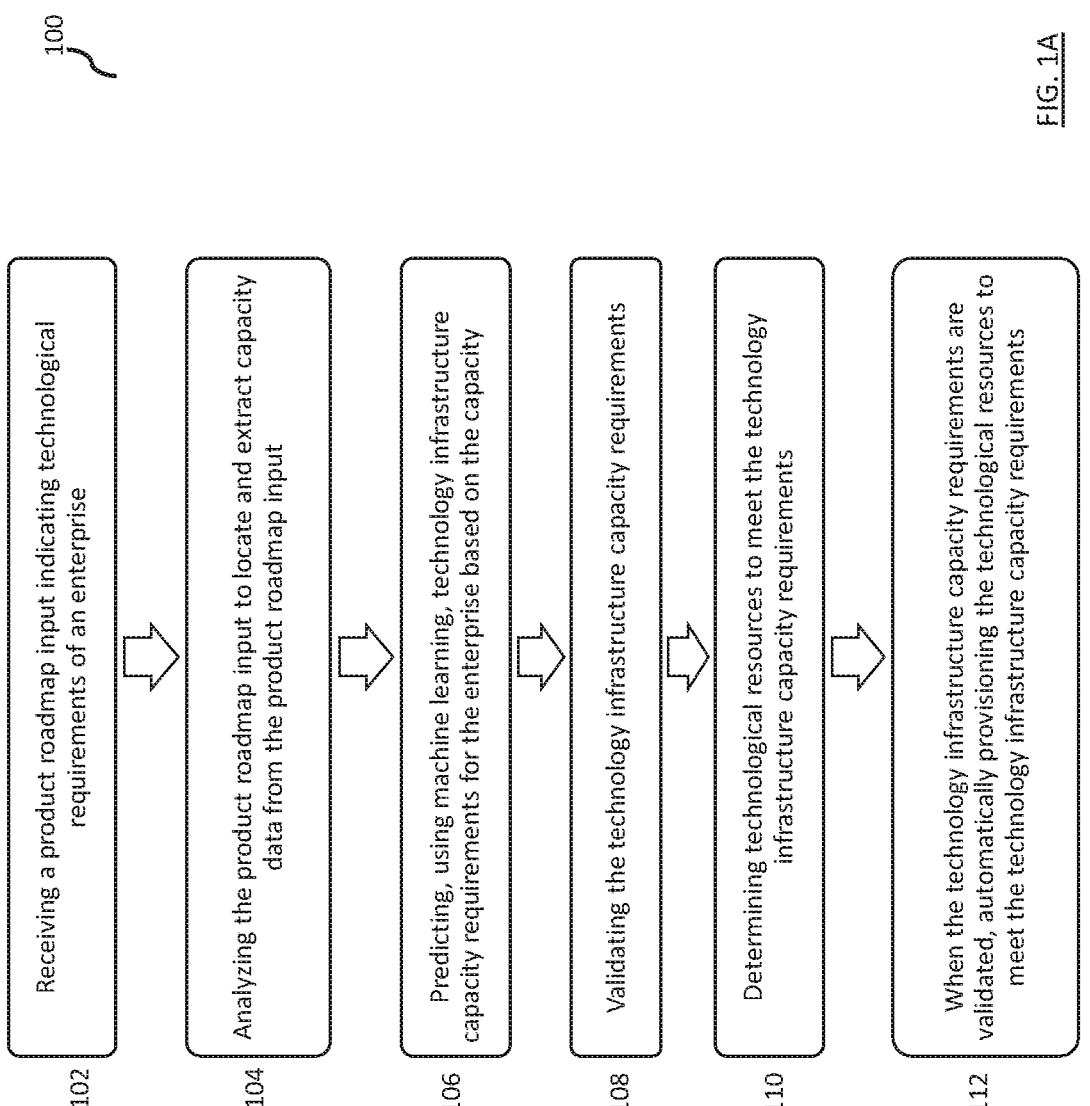
FIG. 1A illustrates an example embodiment of a method for predictive analysis of technology infrastructure capacity requirements, according to various embodiments.

FIG. 1A illustrates an example embodiment of a method for predictive analysis of technology infrastructure capacity requirements, according to various embodiments. The method 100 includes receiving a product roadmap input indicating technological requirements of an enterprise at step 102. The product roadmap input may be received by a query to a database or from an input from a user interface or other inputs, in various embodiments. In various embodiments, the product roadmap input may include a forecast of product development and technological needs for the enterprise for a predetermined time period. The method 100 further includes analyzing the product roadmap input to locate and extract capacity data from the product roadmap input, at step 104. In some examples, analyzing the product roadmap input to locate and extract capacity data includes using a programmable bot to locate and extract the capacity data. Using machine learning, technology infrastructure capacity requirements are predicted for the enterprise based on the capacity data, at step 106. Predicting technology infrastructure capacity requirements for the enterprise based on the capacity data includes predicting technology infrastructure capacity requirements based on user demand, in various embodiments. In various examples, using machine learning includes using a machine learning model including one or more of a long short-term memory (LSTM) network, bidirectional encoder representations from transformers (BERT), natural language processing (NLP), or an artificial intelligence (AI)-based knowledge tree.

At step 108, the technology infrastructure capacity requirements are validated. The validation may be completely automated or may include review by one or more authorized users, in various examples. Additional examples of capacity requirements validation may include ensuring specific resource types requested align with known architectural guidelines and/or blueprints. If infrastructure types are not aligned, the method 100 may include providing an alerting mechanism to alert a user, in various examples. In various embodiments, the model may include additions and support for resource types not historically supported.

Technological resources are determined to meet the technology infrastructure capacity requirements, at step 110. In one example, machine learning is used to determine an amount of resources based on the predicted infrastructure capacity requirements. In some embodiments, a look up table is used to determine technological resources to meet the predicted requirements. In various embodiments, the lookup table or defined architectural blueprints which identify technological resources based upon architectural patterns may be used to determine technological resources for automating provisioning to meet predictive requirements.

When the technology infrastructure capacity requirements are validated, the technological resources are automatically provisioned to meet the technology infrastructure capacity requirements, at step 112. In various examples, automatically provisioning the technological resources includes updating one or more files in a git repository. In some examples, components such as cloud resources may be provisioned or brought online to meet the technology infrastructure capacity requirements.

In various embodiments, the method 100 may further include displaying, on a graphical user interface in communication with the computer system, a list of the technology infrastructure capacity requirements. The method 100 may also include displaying, on a graphical user interface in communication with the computer system, a list of the technological resources to meet the infrastructure capacity requirements, in some examples. In some embodiments, the method 100 may also include comparing a cost of the technological resources to a quota threshold, and providing an alert to a user of the computer system based on the comparison. The method 100 may further include receiving additional input from a user generated by text entry into a plurality of boxes on an interactive interface, in some embodiments.

The present subject matter includes a system for performing predictive analysis of broad future technology infrastructure capacity needs for an enterprise. The present system may include determining predictive resource needs, in various examples. In some examples, a product roadmap may be used for predictive analysis of technology infrastructure capacity needs. In other examples, this input may be used to predict future needs for technological ("tech") health of an enterprise. The future capacity or health needs of a technology infrastructure may include upgrades, data center availability, etc.

In various examples, training data for the prediction model (e.g., at step 106) may be labeled such as with identification of new components. For example, an example label may include "we will add 2,000 components over next few years." Based on a resulting prediction, kickoff processes may be automated (e.g., git repositories updated) by the system (e.g., at step 112), in some examples. In various embodiments, the present system may examine a type of roadmap item, such as data, application, etc., and determine what processes need to happen for a given role (e.g., resource needs may be changed based on roadmap item), and/or determine what infrastructure setup or needs may change for different roadmap items (e.g., at steps 104 and 106).

In various embodiment, the present system may be applied to tech health implementations for an enterprise. For example, the present system may correlate dependencies to changes, such as tech health compared to component inventor, to evaluate the tech changes from the roadmap over time. In various examples, the present system may provide for planning at the enterprise level for technological infrastructure prediction based on a product roadmap.

Various embodiments incorporate data from a life cycle management application that may create components (application programming interface (API)-like web service or another component of a larger application) to start an onboarding process. In some examples, the system interfaces with a git repository to determine how many components are in use and the status of the components, using a source code repository git hub (e.g., at step 104). According to various examples, cloud onboarding requests, such as from a cloud application management portal, may specify infrastructure needs for development environments for individual components. The system may use the information to determine what types of tech are being deployed, and what tech is needed for the future for the enterprise (e.g., at step 106). In some examples, components such as cloud resources may be provisioned or brought online based on system output (e.g., at step 112).

In various examples, roadmap items are received as input and keywords are extracted from business language to drive demand to infrastructure capacity needs (e.g., at step 104). The system may use machine learning to make a prediction and use a checkpoint for validation (e.g., at steps 106 and 108), in various embodiments. Various examples of the system use an interpreter to extract the data from the roadmap (e.g., at step 104). According to various embodiments, the present system uses "just in-time" provisioning to automate build out of resources (such as cloud resources, in an example) to meet validated capacity needs in alliance with the roadmap (e.g., at steps 110 and 112). The system may include a component for enterprise budgeting, such that future expenditures for tech resource capacity needs are reflected. In various examples, the present system provides for continuous integration to automate environments and production of tech resources. The system may be automated into budgetary systems based on the updated roadmap for future enterprise planning.

According to various embodiments, the present system may obtain data for training the machine learning by using a chat bot to pull data out of the roadmap input (e.g., at step 104). In one example the roadmap input may include a six fiscal quarter roadmap for business and tech. Other durations of roadmaps may be used without departing from the scope of the present subject matter. In addition, other types of inputs, such as production data and hiring data or any other tech-related data for an enterprise, may be used in addition to or instead of the product roadmap input (e.g., at step 102). In some embodiments, the roadmap may include callouts for new demand for technological resources that drive quarterly planning of budget and activity, prioritizing spending for the enterprise and driving topics discussed in planning meetings.

The system may include an automated mechanism for provisioning cloud based resources, such that the enterprise is on a "pay as you go" methodology (e.g., at step 112), in some examples. In one example, the system provides a user interface (or UI) for maintaining the system and/or updating the roadmap. In various embodiments, the system may provide for transparency of its output until the enterprise gets comfortable with the output of the system, including reporting capability of results. The system may use roadmap items to drive the budget for cloud provisioning and infrastructure capacity, in various examples. In addition, the system may be used to match up and check to determine if the output aligns with capacity or if it is drifting from the roadmap.

In various embodiments, the system includes an alert mechanism if there is a threshold deviation from the roadmap, to let leadership of the enterprise know that roadmap might be wrong and might need to be adjusted. In some embodiments, new values are placed into roadmap on a periodic basis. The system may reevaluate periodically (such as every quarter) to make sure of consistency, and send feedback such as alerts if results extend past a quota that has been set, such as a quota in cloud provisioning in one example.

The present system and method uses predictive analysis to provide for using a business roadmap to drive demand for technological infrastructure for an enterprise. For example, the system may use roadmap input to determine that the enterprise needs 2000 components of a tech resource to support a product described in the roadmap (e.g., at step 110). The system may predict infrastructure needs based on demand for a product, in some examples. In various embodiments, the system may employ an architecture tool base to examine roadmaps and to glean information from the roadmap, such as by using roadmap keywords to perform infrastructure capacity analysis (e.g., at step 104).

In one example, the system may work to migrate services off one system to another system with more or less capacity based on the prediction (e.g., at step 112). The system may update records in a git hub repository, or may create a new git hub repository, in various embodiments. In some examples, the system may determine how many APIs may be used before moving from one tech system to another tech system (e.g., at step 112), using various data points to determine if a new gateway is needed.

Figure 1B:
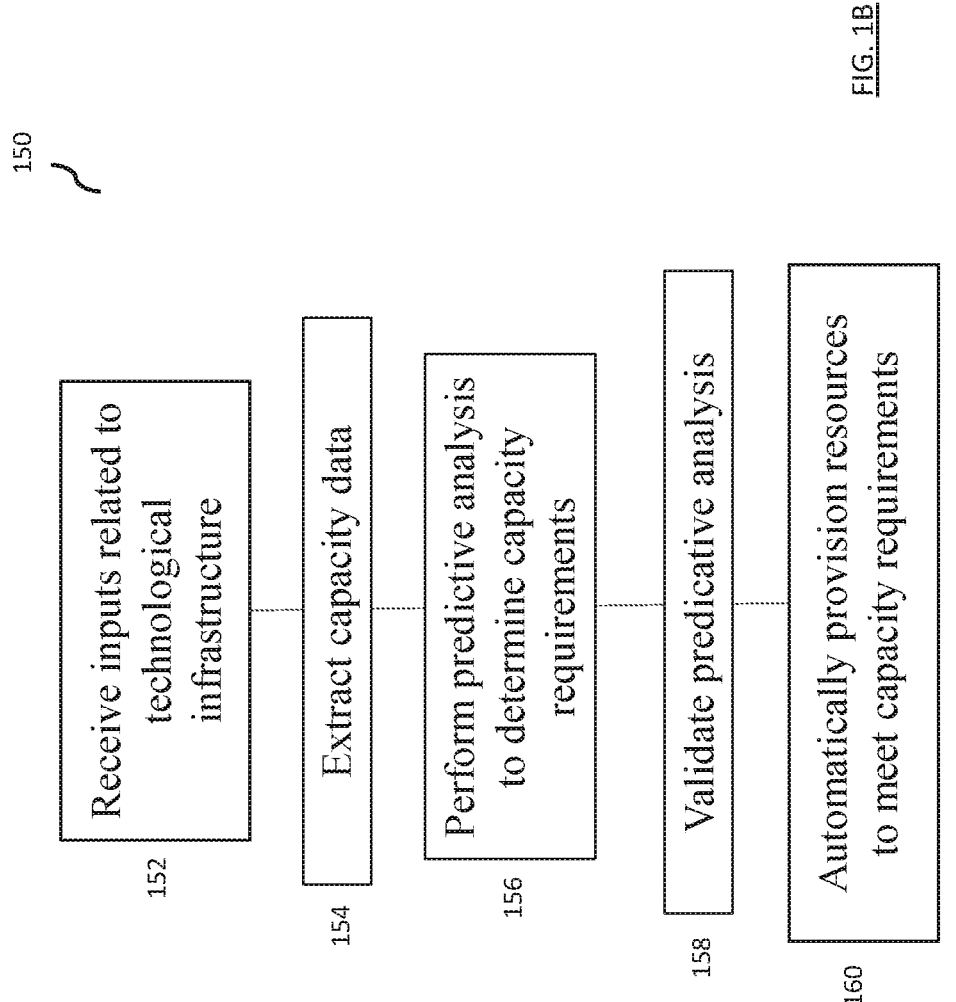
FIG. 1B illustrates an example embodiment of a method for using predictive analysis of technology infrastructure capacity requirements, according to various embodiments.

FIG. 1B illustrates an example embodiment of a method for using predictive analysis of technology infrastructure capacity requirements, according to various embodiments. According to various embodiments, the method 150 may include receiving inputs related technological infrastructure, at step 152. The inputs may include a product roadmap or other types of enterprise technology status or health inputs, in various embodiments. The method 150 may also include extracting capacity data from the inputs, at step 154. The capacity data may be extracted using machine learning, such as with a programmable bot, in various embodiments. In some embodiments, the bot may identify keywords extracted from business language and corresponding text to be used in the predictive analysis.

The method 150 continues at step 156, where predictive analysis is performed to determine capacity requirements, in various examples. In various embodiments, performing predictive analysis includes using machine learning or artificial intelligence. For example, the system may use the input to determine that the enterprise needs 2000 components of a tech resource to support a product described in the input. At step 158, the method 150 may include validating the predictive analysis, in various embodiments. In various examples, validation may be completely automated such as by comparing the prediction values to a programmable range of acceptable values, in various embodiments. In some examples, the validation may include a user review of the prediction values using an interactive interface. For example, the user may review the prediction value of 2000 components and determine that the cost is not within a budget and thus not validate the prediction. Architecture blueprints and patterns may be used as input to define the predictive model, such as in the module of FIG. 3, in various examples.

At step 160, the method may include automatically provisioning technological resources to meet the determined capacity needs, in various embodiments. This automatic provisioning may be conditioned on the validation, in various embodiments. In some embodiments, the automatic provisioning may include taking steps to obtain or acquire hardware or software components (such as, but not limited to, cloud resources, or licensing requirements for such components) needed for the determined capacity needs. In various examples, the automatic provisioning may include updating one or more files in a git repository. The automatic provisioning may include obtaining a license required for the resources or components to meet the determined capacity needs, in various examples. Calculations and predictions used herein may include using a blockchain, smart contracts, or machine learning, in various embodiments.

Various embodiments include a computing system with one or more processors and a data storage system in communication with the one or more processors, wherein the data storage system comprises instructions thereon that, when executed by the one or more processors, causes the one or more processors to execute the steps of the methods of FIGS. 1A-1B. In some examples, the machine learning may include a machine learning model including a neural network. The machine learning model may include one or more of a long short-term memory (LSTM) network, bidirectional encoder representations from transformers (BERT), natural language processing (NLP), or an artificial intelligence (AI)-based knowledge tree, in various examples. Other types of machine learning models may be used without departing from the scope of the present subject matter. In some examples, the present platform may use a blockchain and/or smart contracts to implement the predictive analysis of technology infrastructure capacity requirements.

Various embodiments include a non-transitory computer-readable storage medium, the non-transitory computer-readable storage medium including instructions that, when executed by computers, cause the computers to perform operations including the methods of FIGS. 1A-1B. In various embodiments, the present system runs simulations to train the machine learning models, and to identify process improvements and optimization for predictive analysis of technology infrastructure capacity requirements. Training of the models may be accomplished online or offline, in various embodiments. According to various embodiments, the method may include using artificial intelligence.

Figure 2:
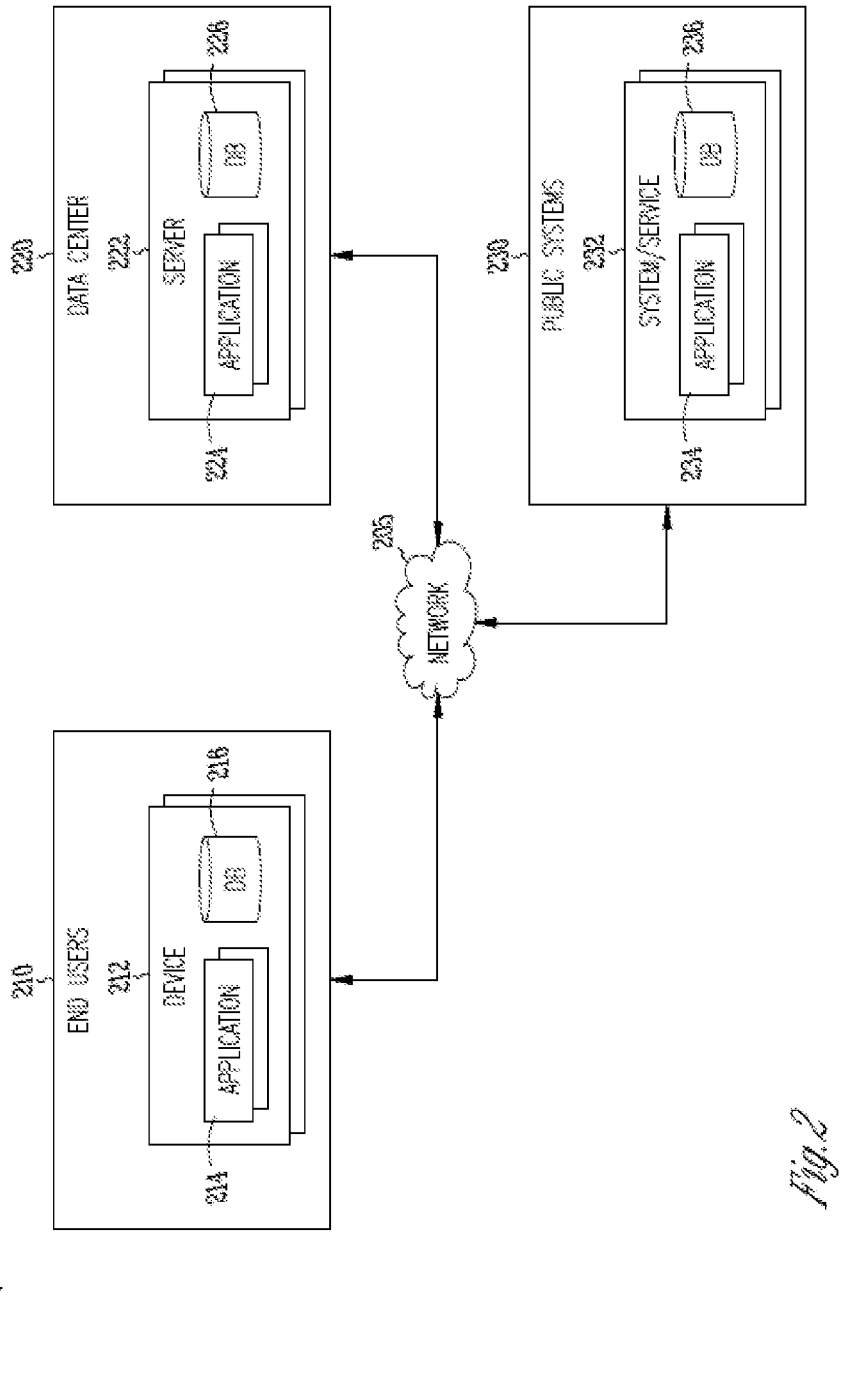
FIG. 2 illustrates an exemplary infrastructure for use in the present subject matter, according to various embodiments.

FIG. 2 illustrates an exemplary infrastructure for providing a system of the present subject matter. The infrastructure may comprise a distributed system 200 including a computing system that may include a client-server architecture or cloud computing system. Distributed system 200 may have one or more end users 210. An end user 210 may have various computing devices 212, which may be a machine 500 as described below. The end-user computing devices 212 may comprise applications 214 that are either designed to execute in a stand-alone manner, or interact with other applications 214 located on the device 212 or accessible via the network 205. These devices 212 may also comprise a data store 216 that holds data locally, the data being potentially accessible by the local applications 214 or by remote applications.

The system 200 may also include one or more data centers 220. A data center 220 may be a server 222 or the like associated with a business entity that an end user 210 may interact with. The server 222 or other portions of the distributed system may create and manage the system for predictive analysis of technology infrastructure capacity requirements, such as by performing operations including the methods of FIGS. 1A-1B, in various embodiments. The business entity may be a computer service provider, as may be the case for a cloud services provider, or it may be a consumer product or service provider, such as a financial institution. The data center 220 may comprise one or more applications 224 and databases 226 that are designed to interface with the applications 214 and databases 216 of end-user devices 212. Data centers 220 may represent facilities in different geographic locations where the servers 222 may be located. Each of the servers 222 may be in the form of a machine(s) 500.

The system 200 may also include publicly available systems 230 that comprise various systems or services 232, including applications 234 and their respective databases 236. Such applications 234 may include news and other information feeds, search engines, social media applications, and the like. The systems or services 232 may be provided as comprising a machine(s) 500.

The end-user devices 212, data center servers 222, and public systems or services 232 may be configured to connect with each other via the network 205, and access to the network by machines may be made via a common connection point or different connection points, e.g., a wireless connection point and a wired connection. Any combination of common or different connections points may be present, and any combination of wired and wireless connection points may be present as well. The network 205, end users 210, data centers 220, and public systems 230 may include network hardware such as routers, switches, load balancers and/or other network devices.

Other implementations of the system 200 are also possible. For example, devices other than the client devices 212 and servers 222 shown may be included in the system 200. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 222.

Figure 3:
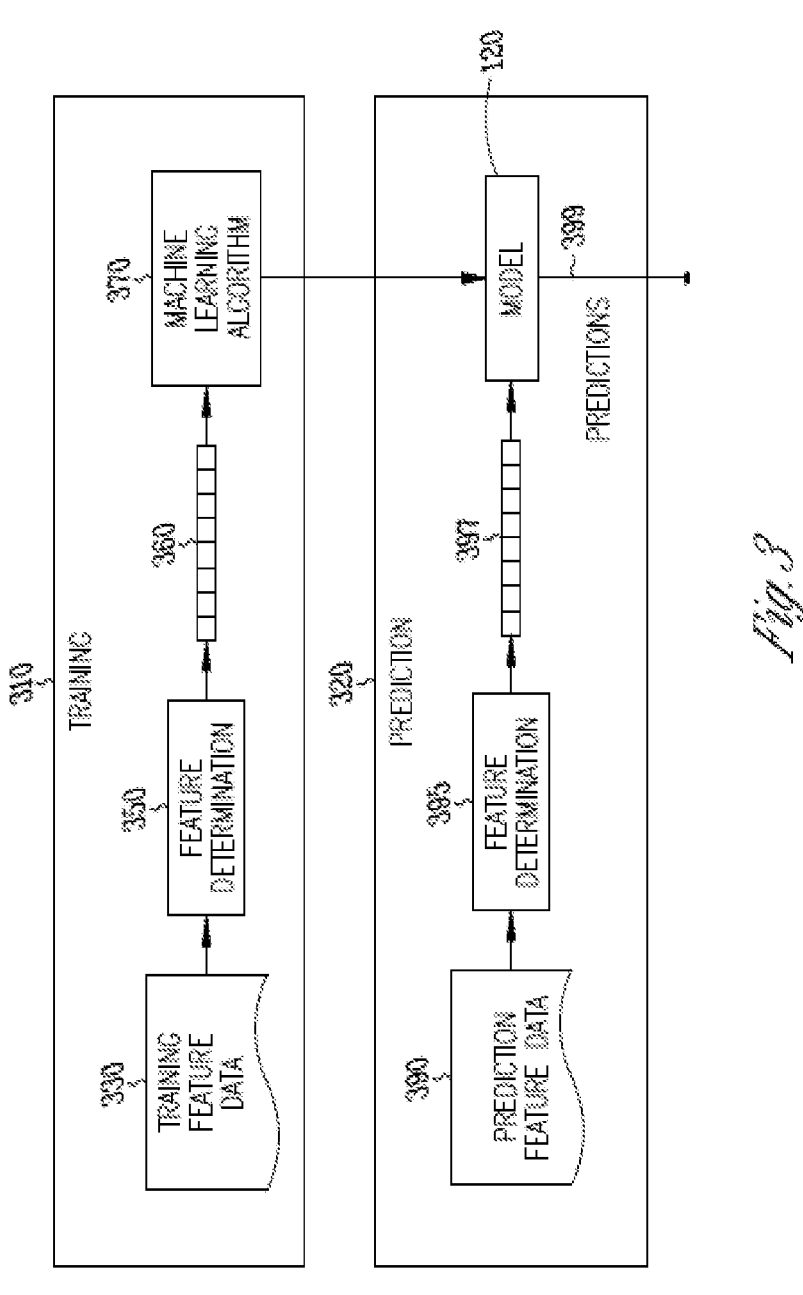
FIG. 3 illustrates an example machine learning module for predictive analysis of technology infrastructure capacity requirements, according to various embodiments.

FIG. 3 shows an example machine learning module 300 according to some examples of the present disclosure. The machine learning module 300 may be implemented in whole or in part by one or more computing devices. In some examples, the training module 310 may be implemented by a different device than the prediction module 320. In these examples, the model 120 may be created on a first machine and then sent to a second machine. Architecture blueprints and patterns may be used as input to define a predictive model for the machine learning module 300, in various examples.

Machine learning module 300 utilizes a training module 310 and a prediction module 320. Training module 310 inputs training feature data 330 into feature determination module 350. The training feature data 330 may include data determined to be predictive of technology infrastructure capacity requirements. Categories of training feature data may include product roadmaps, product roadmap items, lists of existing technological system components, lists of new technological system components, other third-party data, or the like. Specific training feature data and prediction feature data 390 may include, for example one or more of: current hardware and software capacity, past hardware and software capacity, and the like.

Feature determination module 350 selects training vector 360 from the training feature data 330. The selected data may fill training vector 360 and comprises a set of the training feature data that is determined to be predictive of technology infrastructure capacity requirements. In some examples, the tasks performed by the feature determination module 350 may be performed by the machine learning algorithm 370 as part of the learning process. Feature determination module 350 may remove one or more features that are not predictive of technology infrastructure capacity requirements to train the model 120. This may produce a more accurate model that may converge faster. Information chosen for inclusion in the training vector 360 may be all the training feature data 330 or in some examples, may be a subset of all the training feature data 330.

In other examples, the feature determination module 350 may perform one or more data standardization, cleanup, or other tasks such as encoding non numerical features. For example, for categorical feature data, the feature determination module 350 may convert these features to numbers. In some examples, encodings such as "One Hot Encoding" may be used to convert the categorical feature data to numbers. This enables a representation of the categorical variables as binary vectors and provided a "probability-like" number for each label value to give the model more expressive power. One hot encoding represents a category as a vector whereby each possible category value is represented by one element in the vector. When the data is equal to that category value, the value of the vector is a '1' and all other elements are zero (or vice versa).

The training vector 360 may be utilized (along with any applicable labels) by the machine learning algorithm 370 to produce a model 120. In some examples, other data structures other than vectors may be used. The machine learning algorithm 370 may learn one or more layers of a model. Example layers may include convolutional layers, dropout layers, pooling/up sampling layers, SoftMax layers, and the like. Example models may be a neural network, where each layer is comprised of a plurality of neurons that take a plurality of inputs, weight the inputs, input the weighted inputs into an activation function to produce an output which may then be sent to another layer. Example activation functions may include a Rectified Linear Unit (ReLu), and the like. Layers of the model may be fully or partially connected. In other examples, machine learning algorithm may be a gradient boosted tree and the model may be one or more data structures that describe the resultant nodes, leaves, edges, and the like of the tree.

In the prediction module 320, prediction feature data 390 may be input to the feature determination module 395. The prediction feature data 390 may include the data described above for the training feature data, but for a specific items such as software or hardware items for technological infrastructure. In some examples, the prediction module 320 may be run sequentially for one or more items. Feature determination module 395 may operate the same, or differently than feature determination module 350. In some examples, feature determination modules 350 and 395 are the same modules or different instances of the same module. Feature determination module 395 produces vector 397, which is input into the model 120 to produce predictions 399. For example, the weightings and/or network structure learned by the training module 310 may be executed on the vector 397 by applying vector 397 to a first layer of the model 120 to produce inputs to a second layer of the model 120, and so on until the prediction 399 is output. As previously noted, other data structures may be used other than a vector (e.g., a matrix).

The training module 310 may operate in an offline manner to train the model 120. The prediction module 320, however, may be designed to operate in an online manner. It should be noted that the model 120 may be periodically updated via additional training and/or user feedback. For example, additional training feature data 330 may be collected. The feedback, along with the prediction feature data 390 corresponding to that feedback, may be used to refine the model by the training module 310.

In some example embodiments, results obtained by the model 120 during operation (e.g., outputs produced by the model in response to inputs) are used to improve the training data, which is then used to generate a newer version of the model. Thus, a feedback loop is formed to use the results obtained by the model to improve the model.

The machine learning algorithm 370 may be selected from among many different potential supervised or unsupervised machine learning algorithms. Examples of learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, gradient boosted tree, linear classifiers, quadratic classifiers, k-nearest neighbor, linear regression, logistic regression, a region based CNN, a full CNN (for semantic segmentation), a mask R-CNN algorithm for instance segmentation, and hidden Markov models. Examples of unsupervised learning algorithms include expectation-maximization algorithms, vector quantization, and information bottleneck method. In various embodiments, smart contracts or blockchain may be used to calculate and/or implement predictive analysis of technology infrastructure capacity requirements.

Figure 4:
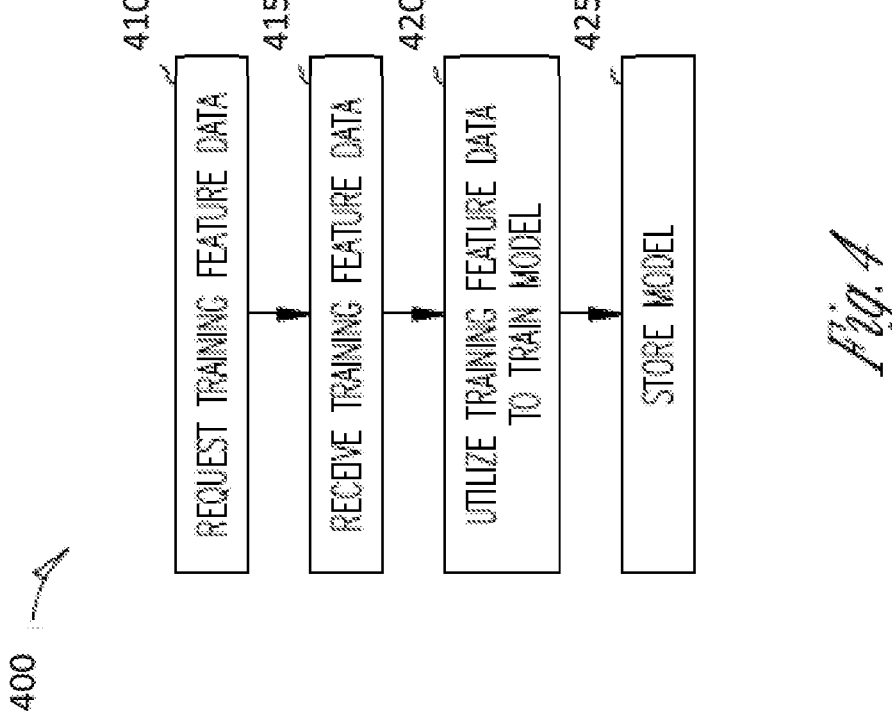
FIG. 4 illustrates a flowchart of a method of training a model for predictive analysis of technology infrastructure capacity requirements, according to various embodiments.

FIG. 4 illustrates a flowchart of a method 400 of training a model for predictive analysis of technology infrastructure capacity requirements, according to various embodiments. At operation 410 the training module (e.g., training module 310 as implemented by a model system) may request training feature data, from one or more systems. At operation 415 the training module may receive the training feature data. The training feature data may be processed using more data standardization, cleanup, or other tasks such as encoding non numerical features (e.g., one hot encoding). At operation 420, the training model may use the training feature data to train the model. For example, by creating a gradient boosted tree, neural network, or the like. At operation 425 the model may be stored in a storage device. In some examples in which the training operations and predictions are done on separate computing devices, the model may be transmitted to a computing device doing predictions.

Figure 5:
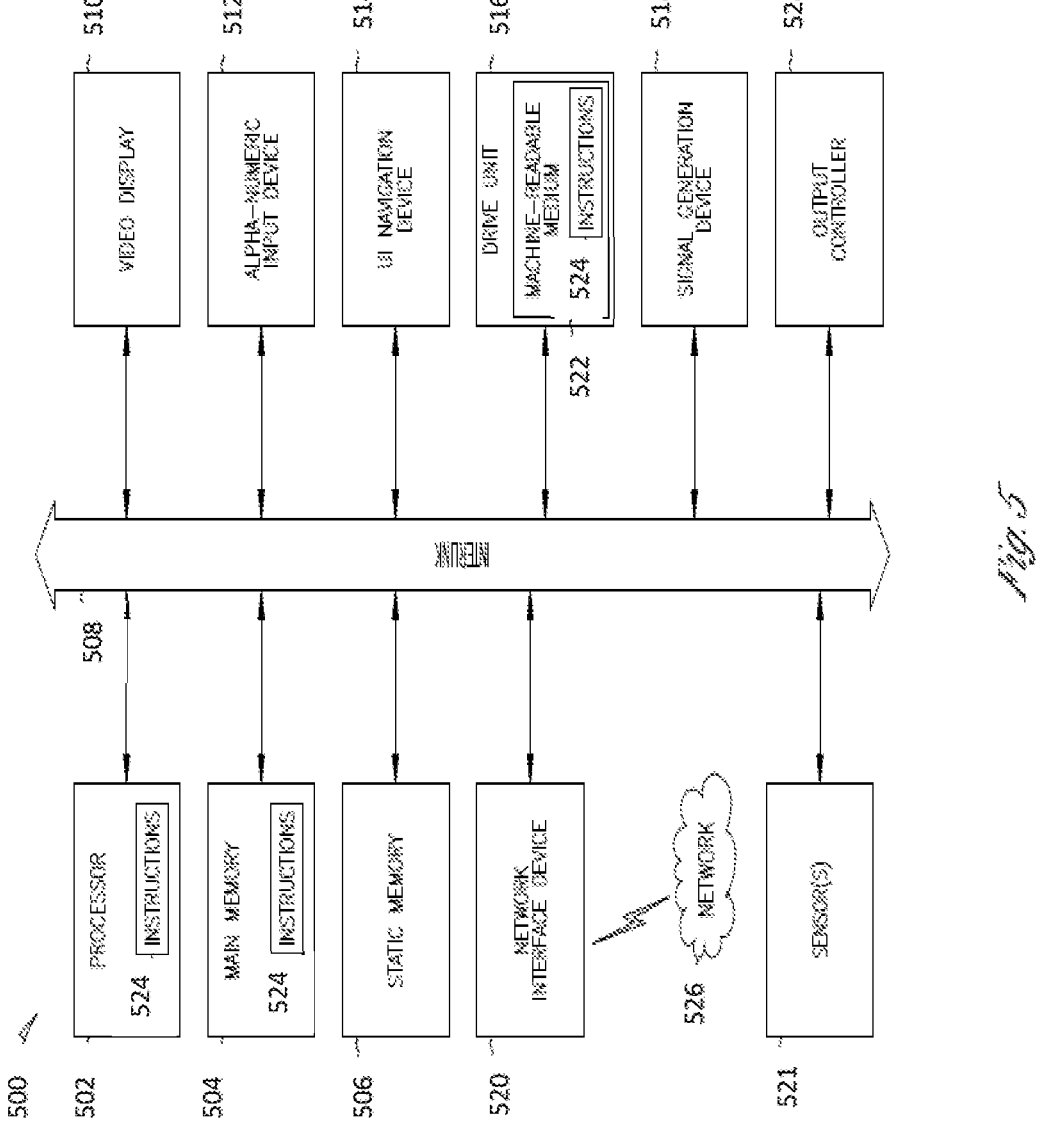
FIG. 5 is a block diagram of a machine in the example form of a computer system within which a set of instructions may be executed, for causing the machine to perform any one or more of the methodologies discussed herein.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may implement one or more of the training and prediction modules 310, 320 (e.g., as software or dedicated hardware) and may be configured to perform the methods of FIGS. 1A, 1B and 4. The machine 500 may be in the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine-readable media. In some examples, machine readable media may include machine readable media that is not a transitory propagating signal.

The instructions 524 may further be transmitted or received over a communications network 526 using a transmission medium via the network interface device 520. The Machine 500 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques.

Other Notes and Examples

Example 1 is a computer-implemented method including receiving, by a computer system, a product roadmap input indicating technological requirements of an enterprise, analyzing, by the computer system, the product roadmap input to locate and extract capacity data from the product roadmap input, predicting, by the computer system using machine learning, technology infrastructure capacity requirements for the enterprise based on the capacity data, validating, using the computer system, the technology infrastructure capacity requirements, determining, by the computer system, technological resources to meet the technology infrastructure capacity requirements, and when the technology infrastructure capacity requirements are validated, automatically provisioning, by the computer system, the technological resources to meet the technology infrastructure capacity requirements.

In Example 2, the subject matter of Example 1 optionally further includes displaying, on a graphical user interface in communication with the computer system, a list of the technology infrastructure capacity requirements.

In Example 3, the subject matter of Example 1 optionally further includes displaying, on a graphical user interface in communication with the computer system, a list of the technological resources to meet the infrastructure capacity requirements.

In Example 4, the subject matter of Example 1 optionally includes wherein analyzing the product roadmap input to locate and extract capacity data includes using a programmable bot to locate and extract the capacity data.

In Example 5, the subject matter of Example 1 optionally includes wherein automatically provisioning the technological resources includes updating one or more files in a git repository.

In Example 6, the subject matter of Example 1 optionally further includes comparing, by the computer system, a cost of the technological resources to a quota threshold, and providing, by the computer system, an alert to a user of the computer system based on the comparison.

In Example 7, the subject matter of Example 1 optionally includes wherein predicting technology infrastructure capacity requirements for the enterprise based on the capacity data includes predicting technology infrastructure capacity requirements based on user demand.

In Example 8, the subject matter of Example 1 optionally includes wherein using machine learning includes using a machine learning model including one or more of a long short-term memory (LSTM) network, bidirectional encoder representations from transformers (BERT), natural language processing (NLP), or an artificial intelligence (AI)-based knowledge tree.

In Example 9, the subject matter of Example 1 optionally further includes receiving, by the computer system, additional input from a user generated by text entry into a plurality of boxes on an interactive interface.

Example 10 is a system including: a computing system comprising one or more processors and a data storage system in communication with the one or more processors, wherein the data storage system comprises instructions thereon that, when executed by the one or more processors, causes the one or more processors to: receive a product roadmap input indicating technological requirements of an enterprise, analyze the product roadmap input to locate and extract capacity data from the product roadmap input, predict, using machine learning, technology infrastructure capacity requirements for the enterprise based on the capacity data, validate the technology infrastructure capacity requirements, determine technological resources to meet the technology infrastructure capacity requirements, and when the technology infrastructure capacity requirements are validated, automatically provision the technological resources to meet the technology infrastructure capacity requirements.

In Example 11, the subject matter of Example 10 optionally includes wherein the machine learning includes a machine learning model including a neural network.

In Example 12, the subject matter of Example 11 optionally includes wherein the neural network includes a long short-term memory (LSTM) network.

In Example 13, the subject matter of Example 10 optionally includes wherein the machine learning includes bidirectional encoder representations from transformers (BERT).

In Example 14, the subject matter of Example 10 optionally includes wherein the machine learning includes natural language processing (NLP).

In Example 15, the subject matter of Example 10 optionally includes wherein the machine learning includes an artificial intelligence (AI)-based knowledge tree.

Example 16 is a non-transitory computer-readable storage medium, the non-transitory computer-readable storage medium including instructions that, when executed by computers, cause the computers to perform operations of: receiving a product roadmap input indicating technological requirements of an enterprise, analyzing the product roadmap input to locate and extract capacity data from the product roadmap input, predicting, using machine learning, technology infrastructure capacity requirements for the enterprise based on the capacity data, validating the technology infrastructure capacity requirements, determining technological resources to meet the technology infrastructure capacity requirements, and when the technology infrastructure capacity requirements are validated, automatically provisioning the technological resources to meet the technology infrastructure capacity requirements.

In Example 17, the subject matter of Example 16 optionally includes wherein analyzing the product roadmap input to locate and extract capacity data includes using a programmable bot to locate and extract the capacity data.

In Example 18, the subject matter of Example 16 optionally includes wherein automatically provisioning the technological resources includes updating one or more files in a git repository.

In Example 19, the subject matter of Example 16 optionally includes wherein the medium further includes instructions that, when executed by computers, cause the computers to perform operations of: comparing a cost of the technological resources to a quota threshold, and providing an alert to a user of the computers based on the comparison.

In Example 20, the subject matter of Example 16 optionally includes wherein predicting technology infrastructure capacity requirements for the enterprise based on the capacity data includes predicting technology infrastructure capacity requirements based on user demand.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72 (b) in the United States of America. It is submitted with the understanding that it will not be used to interpret or limit the scope or meaning of the claims.

Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising: receiving, by a computer system, a product roadmap input indicating technological requirements of an enterprise;

analyzing, by the computer system, the product roadmap input to locate and extract capacity data from the product roadmap input;

predicting, by the computer system using machine learning including a machine learning model, technology infrastructure capacity requirements for the enterprise based on the capacity data;

retraining, by the computer system, the machine learning model based on training data using a closed loop system, wherein the predicted technology infrastructure capacity requirements obtained using the machine learning model during operation are used to improve the training data:

generating, by the computer system, a revised machine learning model using the improved training data:

validating, using the computer system, the technology infrastructure capacity requirements using the revised machine learning model;

determining, by the computer system, technological resources to meet the technology infrastructure capacity requirements; and when the technology infrastructure capacity requirements are validated, automatically provisioning, by the computer system, the technological resources to meet the technology infrastructure capacity requirements.

2. The computer-implemented method of claim 1, further comprising:

displaying, on a graphical user interface in communication with the computer system, a list of the technology infrastructure capacity requirements.

3. The computer-implemented method of claim 1, further comprising:

displaying, on a graphical user interface in communication with the computer system, a list of the technological resources to meet the infrastructure capacity requirements.

4. The computer-implemented method of claim 1, wherein analyzing the product roadmap input to locate and extract capacity data includes using a programmable bot to locate and extract the capacity data.

5. The computer-implemented method of claim 1, wherein automatically provisioning the technological resources includes updating one or more files in a git repository.

6. The computer-implemented method of claim 1, further comprising:

comparing, by the computer system, a cost of the technological resources to a quota threshold; and providing, by the computer system, an alert to a user of the computer system based on the comparison.

7. The computer-implemented method of claim 1, wherein predicting technology infrastructure capacity requirements for the enterprise based on the capacity data includes predicting technology infrastructure capacity requirements based on user demand.

8. The computer-implemented method of claim 1, wherein using machine learning includes using a machine learning model including one or more of a long short-term memory (LSTM) network, bidirectional encoder representations from transformers (BERT), natural language processing (NLP), or an artificial intelligence (AI)-based knowledge tree.

9. The computer-implemented method of claim 1, further comprising:

receiving, by the computer system, additional input from a user generated by text entry into a plurality of boxes on an interactive interface.

10. A system comprising: a computing system comprising one or more processors and a data storage system in communication with the one or more processors, wherein the data storage system comprises instructions thereon that, when executed by the one or more processors, causes the one or more processors to:

receive a product roadmap input indicating technological requirements of an enterprise;

analyze the product roadmap input to locate and extract capacity data from the product roadmap input;

predict, using machine learning including a machine learning model, technology infrastructure capacity requirements for the enterprise based on the capacity data;

retrain the machine learning model based on training data using a closed loop system, wherein the predicted technology infrastructure capacity requirements obtained using the machine learning model during operation are used to improve the training data, generate a revised machine learning model using the improved training data, validate the technology infrastructure capacity requirements using the revised machine learning model:

determine technological resources to meet the technology infrastructure capacity requirements; and when the technology infrastructure capacity requirements are validated, automatically provision the technological resources to meet the technology infrastructure capacity requirements.

11. The system of claim 10, wherein the machine learning includes a machine learning model including a neural network.

12. The system of claim 11, wherein the neural network includes a long short-term memory (LSTM) network.

13. The system of claim 10, wherein the machine learning includes bidirectional encoder representations from transformers (BERT).

14. The system of claim 10, wherein the machine learning includes natural language processing (NLP).

15. The system of claim 10, wherein the machine learning includes an artificial intelligence (AI)-based knowledge tree.

16. A non-transitory computer-readable storage medium, the non- transitory computer-readable storage medium including instructions that, when executed by computers, cause the computers to perform operations of: receiving a product roadmap input indicating technological requirements of an enterprise:

analyzing the product roadmap input to locate and extract capacity data from the product roadmap input;

predicting, using machine learning including a machine learning model, technology infrastructure capacity requirements for the enterprise based on the capacity data;

retraining the machine learning model based on training data using a closed loop system, wherein the predicted technology infrastructure capacity requirements obtained using the machine learning model during operation are used to improve the training data, generating a revised machine learning model using the improved training data:

validating the technology infrastructure capacity requirements using the revised machine learning model;

determining technological resources to meet the technology infrastructure capacity requirements; and when the technology infrastructure capacity requirements are validated, automatically provisioning the technological resources to meet the technology infrastructure capacity requirements.

17. The non-transitory computer-readable storage medium of claim 16, wherein analyzing the product roadmap input to locate and extract capacity data includes using a programmable bot to locate and extract the capacity data.

18. The non-transitory computer-readable storage medium of claim 16, wherein automatically provisioning the technological resources includes updating one or more files in a git repository.

19. The non-transitory computer-readable storage medium of claim 16, wherein the medium further includes instructions that, when executed by computers, cause the computers to perform operations of:

comparing a cost of the technological resources to a quota threshold; and providing an alert to a user of the computers based on the comparison.

20. The non-transitory computer-readable storage medium of claim 16, wherein predicting technology infrastructure capacity requirements for the enterprise based on the capacity data includes predicting technology infrastructure capacity requirements based on user demand.

* * * * *